(12) United States Patent
Sprague et al.

(10) Patent No.: US 9,256,064 B1
(45) Date of Patent: Feb. 9, 2016

(54) ANGLED ORIENTATION OF SUB-PIXELS IN AN ELECTROWETTING DISPLAY

(71) Applicant: Amazon Technologies, Inc., Seattle, WA (US)

(72) Inventors: Robert Arthur Sprague, Saratoga, CA (US); Joel Martin Pollack, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/498,956

(22) Filed: Sep. 26, 2014

Related U.S. Application Data (60) Provisional application No. 62/012,064, filed on Jun. 13, 2014.

(51) Int. Cl.
*G02B 26/00* (2006.01)
*G02B 3/12* (2006.01)

(52) U.S. Cl.
CPC .................................. *G02B 26/005* (2013.01)

(58) Field of Classification Search
USPC .................................. 359/290–295, 665–667
See application file for complete search history.

(56) References Cited

U.S. PATENT DOCUMENTS

| | | | | |
|---|---|---|---|---|
| 8,514,479 | B2 * | 8/2013 | Bae ...................... | G02B 26/005 345/84 |
| 8,908,254 | B2 * | 12/2014 | Feenstra .............. | G02B 26/005 359/254 |
| 2013/0242367 | A1 * | 9/2013 | Cho ..................... | G02B 26/005 359/228 |

* cited by examiner

*Primary Examiner* — Mohammed Hasan
(74) *Attorney, Agent, or Firm* — Lee & Hayes, PLLC (57) ABSTRACT

Subject matter disclosed herein relates to arrangements and techniques that provide for improving resolution of black and white images displayed by a display of an image display apparatus, for example an EWD. An electrowetting display device comprising a plurality of sub-pixels. Each sub-pixel comprises a substrate, an electrode layer on the substrate, and a hydrophobic layer on the electrode layer. A first fluid is disposed on the hydrophobic layer and a second fluid is disposed on the first fluid. The second fluid is immiscible with the first fluid. The plurality of sub-pixels is arranged in an angled relationship with respect to horizontal and vertical borders of the electrowetting display device.

20 Claims, 5 Drawing Sheets

ANGLED ORIENTATION OF SUB-PIXELS IN AN ELECTROWETTING DISPLAY

CROSS REFERENCE TO RELATED APPLICATIONS

This claims priority to U.S. Provisional Patent Application No. 62/012,064, filed on Jun. 13, 2014, which is incorporated herein by reference.

BACKGROUND

Many portable electronic devices include displays for displaying various types of images. Examples of such displays include electrowetting displays (EWDs), liquid crystal displays (LCDs), electrophoretic displays (EPDs), light emitting diode displays (LED displays), etc. Generally, such displays are defined by many pixels, where the pixels are themselves defined by sub-pixels. For various color displays, when displaying black and white images, such as, for example, text, video, etc., 2 to 10 sub-pixels, for example, may be utilized to define the black and white pixels.

When an RGBW display displays black and white content, centers of luminance within sub-pixels generally provide a viewer's eyes with the brightest portions within pixels of images displayed as black and white content on the RGBW display. Centers of luminance actually represent imaginary points of how a viewer perceives black and white. When sub-pixels are inactive, the pixels corresponding to the inactive sub-pixels will appear black to the viewer's eyes. When the sub-pixels are activated, the pixels corresponding to the activated sub-pixels will appear white to the viewer's eyes, with the brightest appearance being at the centers of luminance. Due to spacing between centers of luminance along an X direction or along the X axis being different than the spacing between centers of luminance along a Y direction or along the Y axis, when viewing content in the X direction or along the X axis, the display may appear to have a better picture due to the higher resolution in comparison to viewing the content in the Y direction or along the Y axis.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

DETAILED DESCRIPTION

The present disclosure provides arrangements and techniques that provide for improving resolution of black and white images displayed by a display of an image display apparatus, for example an EWD, by arranging sub-pixels in an angled orientation with respect to edges of the display.

In general, image display apparatuses, such as, for example, various portable electronic devices, including, but not limited to, portable computing devices, tablet computers, laptop computers, notebook computers, mobile phones, personal digital assistants (PDAs), and portable media devices (e.g., e-book devices, DVD players, etc.), display images on a display. Examples of such displays include, but are not limited to, LCDs, EWDs and EPDs.

More particularly, a display device, such as an electrowetting display device, for example, can be a thin film transistor electrowetting display (TFT-EWD) that generally includes an array of transmissive, reflective and/or transflective pixels or sub-pixels (referred to herein as sub-pixels) configured to be operated by an active matrix addressing scheme. For example, rows and columns of sub-pixels are operated by controlling voltage levels on a plurality of source lines and gate lines. In this fashion, the display device can produce an image by selecting particular sub-pixels to transmit, reflect or block light. Sub-pixels are addressed (e.g., selected) via rows and columns of the source lines and gate lines that are connected to transistors (e.g., used as switches) included in each sub-pixel. Transistors take up a relatively small fraction of the area of each sub-pixel. For example, the transistor can be located underneath the reflector in reflective displays.

Electrically, each sub-pixel is a small capacitor with a layer of insulating optical material (e.g., liquid crystal material or electrowetting material) sandwiched between two substrates, wherein each substrate generally includes a transparent conductive indium tin oxide (ITO) layer. A one-way current-passing characteristic of the transistor of the sub-pixel prevents charge that is being applied to the sub-pixel from draining between refresh cycles of the display's image.

An electrowetting display employs an applied voltage to change the surface tension of a fluid in relation to a surface. For instance, by applying a voltage to a hydrophobic surface via a pixel electrode in conjunction with a common electrode, the wetting properties of the surface can be modified so that a second fluid has a greater affinity for the surface. Hydrophobic generally refers to repelling polar fluids while hydrophilic generally refers to having an affinity for polar fluids. As one example of an electrowetting display, the modification of the surface energy by applying a voltage causes the electrolyte, considered to be the second fluid, in an electrowetting fluid in individual sub-pixels of the display to adhere to the modified surface and thus, replace an electrowetting oil layer in individual sub-pixels of the display. In accordance with various embodiments, the electrowetting oil may be colored. In accordance with other embodiments, color filters may be included with each sub-pixel. The electrowetting oil layer is generally made up of an oil that is electrically non-conductive and may for instance be an alkane like hexadecane or silicone oil. Thus, the electrowetting fluids in the individual sub-pixels of the display responding to the change in surface tension act as an optical switch.

When the voltage is absent, the electrowetting oil forms a continuous film within a sub-pixel, and a color may thus be visible to a user of the display, either via the electrowetting oil being colored or via a color filter. Additionally, the sub-pixels may provide a black pixel (for either a black and white display or a color display) through the combination of colors of sub-pixels. On the other hand, when the voltage is applied to the sub-pixel, the electrowetting oil is displaced and the sub-pixel becomes transparent, thus providing a light or white sub-pixel, or a light or white pixel (for either a black and white display or a color display) through the combination of subpixels. When multiple sub-pixels of the display are independently activated, the display can present a color or grayscale image. The sub-pixels may form the basis for a transmissive, reflective, or transmissive/reflective (transreflective) display. Further, the sub-pixels may be responsive to high switching speeds (e.g., on the order of several milliseconds), while employing small sub-pixel dimensions. Accordingly, the electrowetting displays herein may be suitable for applications such as displaying video and/or static content. In addition, the low power consumption of electrowetting displays in general makes the technology suitable for displaying content on portable display devices that rely on battery power.

In accordance with various embodiments, the sub-pixels are slanted with respect to borders or edges of the EWD such that the sub-pixels are at an angle with respect to X and Y axes defined by the EWD. More particularly, the sub-pixels are at a 45 degree angle with respect to the X and Y axes defined by the EWD. In accordance with various embodiments of the EWD, the sub-pixels have a substantially rectangular shape. Thus, in accordance with various embodiments, the major axis of each sub-pixel is at approximately a 45-degree angle with respect to the X axis defined by the EWD. The minor axis is at approximately a 45-degree angle with respect to the Y axis defined by the EWD. In accordance with various embodiments, centers of luminance with respect to pixels of the EWD defined by the sub-pixels are within green and white sub-pixels.

Due to the sub-pixels being arranged at an angle, the centers of luminance are spaced apart substantially the same distance both horizontally and vertically, i.e. in both the X and Y directions of the EWD. Thus, the EWD has a resolution of approximately 312 ppi in both the X and Y directions for black and white content displayed by the EWD. For color content, the resolution of the EWD is approximately 156 ppi in both the X and Y directions for the EWD. Thus, an overall viewer experience is improved and more consistent in both the X and Y directions.

Figure 1:
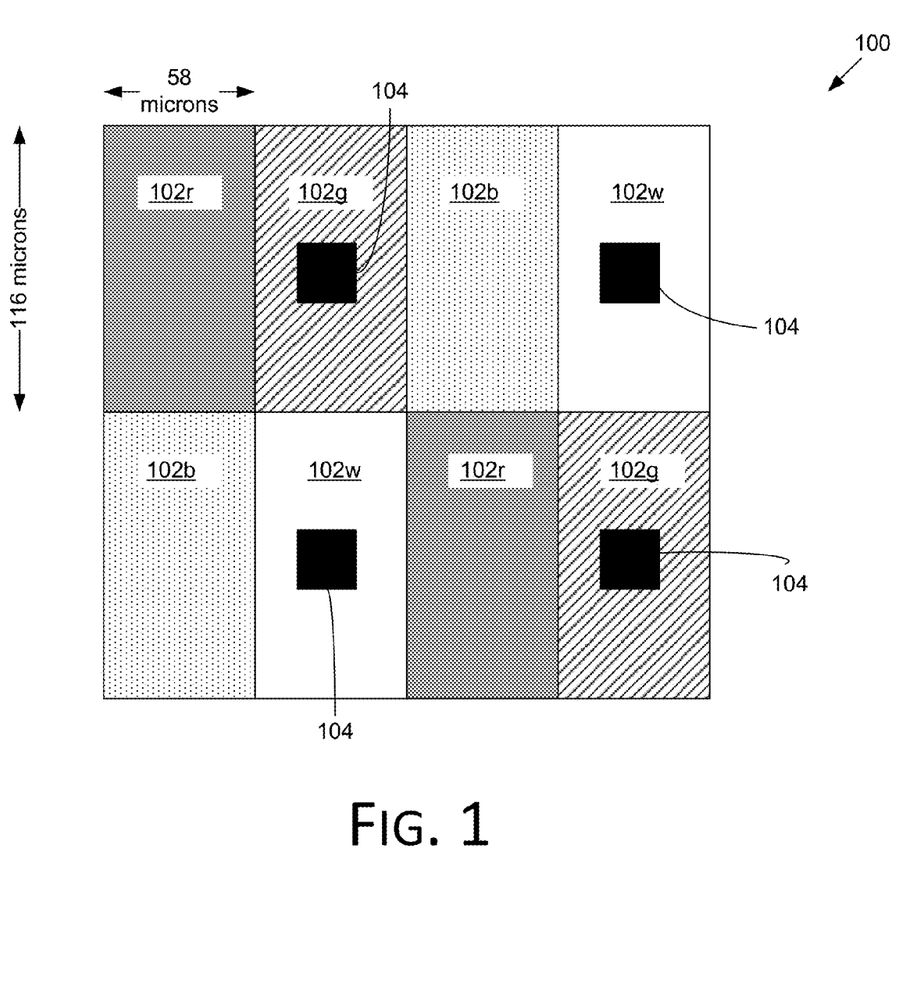
FIG. 1 is a schematic view of an arrangement of red, green, blue and white (RGBW) sub-pixels.

FIG. 1 schematically illustrates an arrangement 100 of red, green, blue and white (RGBW) sub-pixels 102r, 102g, 102b and 102w for an RGBW display, for example an EWD. When the RGBW display displays black and white content, centers of luminance 104 within the green and white sub-pixels 102g, 102w generally provide a viewer's eyes with the brightest portions within pixels of images displayed as black and white content on the RGBW display. As previously noted, centers of luminance 104 actually represent imaginary points of how a viewer perceives black and white. When sub-pixels 102 are inactive, the pixels corresponding to the inactive sub-pixels will appear black to the viewer's eyes. When the sub-pixels 102 are activated, e.g., a voltage is applied to the EWD sub-pixels 102, the pixels corresponding to the activated sub-pixels will appear white to the viewer's eyes, with the brightest appearance being at the centers of luminance 104.

As can be seen in FIG. 1, a width of the sub-pixels 102 for the EWD along an X axis is approximately 58 microns, resulting in a black and white resolution of approximately 440 pixels per inch (ppi) and a color resolution of approximately 220 ppi. However, a length of the subpixels along a Y axis is 116 microns, thereby resulting in a black and white resolution of approximately 220 ppi for a black and white display and a color resolution of approximately 110 ppi. Thus, when viewing content in an X direction or along the X axis, the display may appear to have a better picture due to the higher resolution in comparison to viewing the content in a Y direction or along the Y axis.

Figure 2:
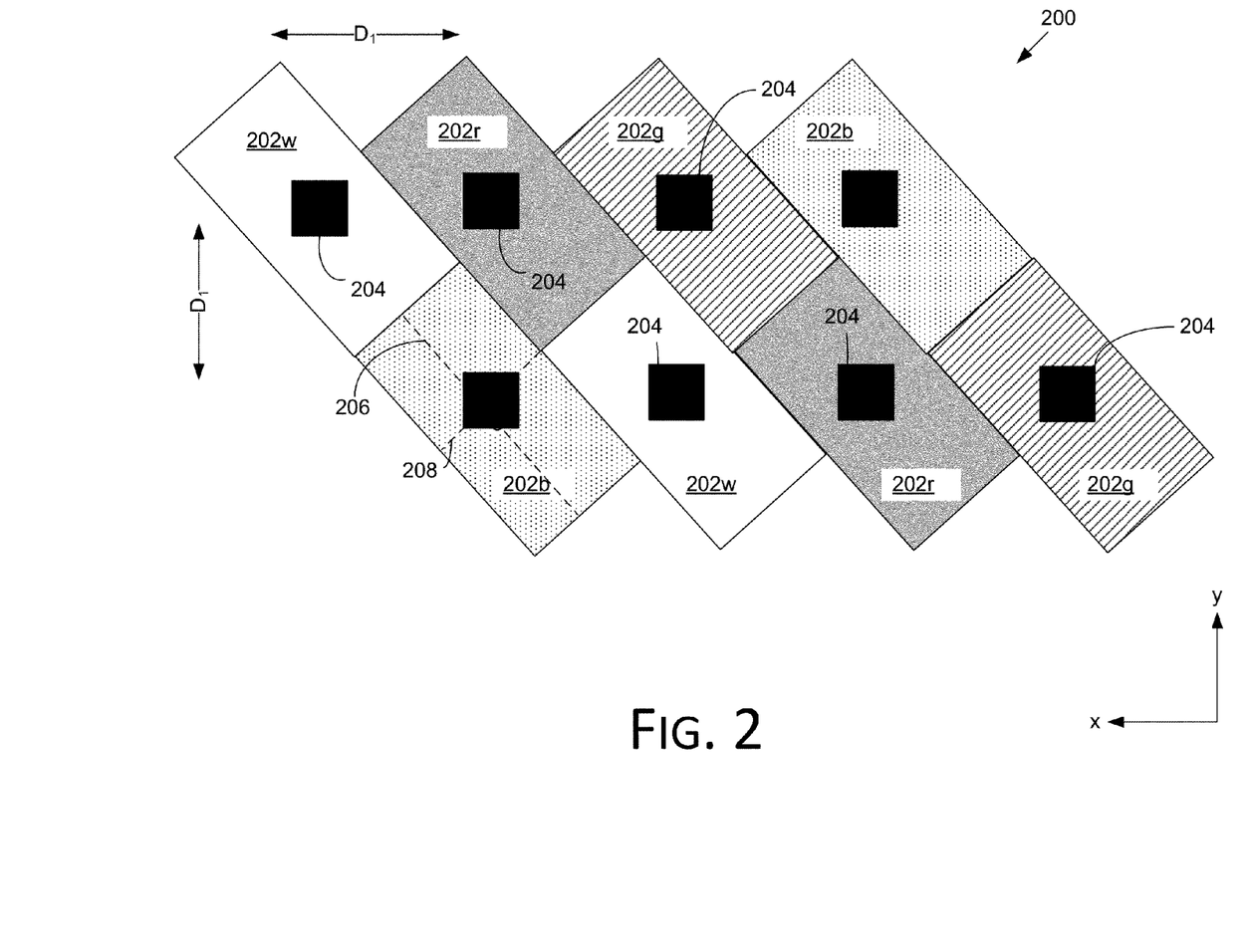
FIG. 2 is a schematic view of an arrangement of sub-pixels, according to various embodiments.

FIG. 2 schematically illustrates an example of an arrangement 200 of sub-pixels 202 for a display, such as, for example, an EWD. In accordance with various embodiments, the EWD is a RGBW display and thus, each sub-pixel is one of a red sub-pixel 202r, green sub-pixel 202g, blue sub-pixel 202b and white sub-pixel 202w. In other embodiments, the EWD is an RGB display and thus, would not include any white sub-pixels 202w. As can be seen in the example of FIG. 2, the sub-pixels 202 are arranged in a repeating pattern of a red sub-pixel 202r, a green sub-pixel 202g, a blue sub-pixel 202b and a white sub-pixel 202w along the X axis that alternates with respect to the Y axis.

The sub-pixels 202 are arranged diagonally with respect to X and Y axes of the EWD. The sub-pixels 202 are generally arranged at a 45 degree angle with respect to the X and Y axes, but may be arranged or orientated at other angles with respect to X and Y axes depending upon the application and/or display type. In accordance with various embodiments, two sub-pixels 202 define each pixel of the EWD. As is known, each pixel may be made up of as many as 10 sub-pixels 202. For displaying black and white content on the EWD, a center of luminance 204 for black and white pixels is provided in each green sub-each sub-pixel 202. Thus, when displaying black and white content on the EWD, when the sub-pixels 202 are inactive, a corresponding pixel defined by two of the inactive sub-pixels 202 will appear black to a viewer. When the sub-pixels 202 are activated, based upon the centers of luminance 204 within the sub-pixels 202, a corresponding pixel defined by two activated sub-pixels will appear white to the viewer. For displaying colored content, the sub-pixels 202 will be activated and inactivated to display various colors, including black and white.

In accordance with various embodiments, the sub-pixels 202 of the EWD have a substantially rectangular shape. The pixel regions 202 may have other shapes depending upon the application and/or display type. A length of each sub-pixel 202 along a major axis 206 defining the rectangle is approximately 116 microns, while a width of each sub-pixel 202 along a minor axis 208 defining the rectangle is approximately 58 microns, i.e. the major axis is longer than the minor axis. Thus, as can be seen in FIG. 2, due to the 45 degree orientation of the sub-pixels 202, the centers of luminance 204 are spaced apart substantially the same distance $D_1$ both horizontally and vertically, i.e. in both the X and Y directions. In accordance with various embodiments, the centers of luminance 204 are separated by approximately 81 microns in both the X and Y directions.

In the embodiment of FIG. 2, based upon the 81 microns between the centers of luminance in both the X and Y directions, the resolution for displaying black and white content with the pixels defined by the sub-pixels 202 is approximately 312 ppi in both the X and Y directions, while the resolution for displaying color content with the pixels defined by the sub-pixels 202 is approximately 156 ppi.

By orientating the sub-pixels 202 as illustrated in FIG. 2 compared with the orientation of sub-pixels 102 as illustrated in FIG. 1, the pixel resolutions in the X and Y directions are now the same at 312 ppi. This generally means that the viewer's perception of black and white content is now the same whether one views black and white content such as, for example, text, images, video, etc. in the X direction or the Y direction. Thus, there is now little or no distortion of displayed content in either the X direction or the Y direction.

Figure 3A:
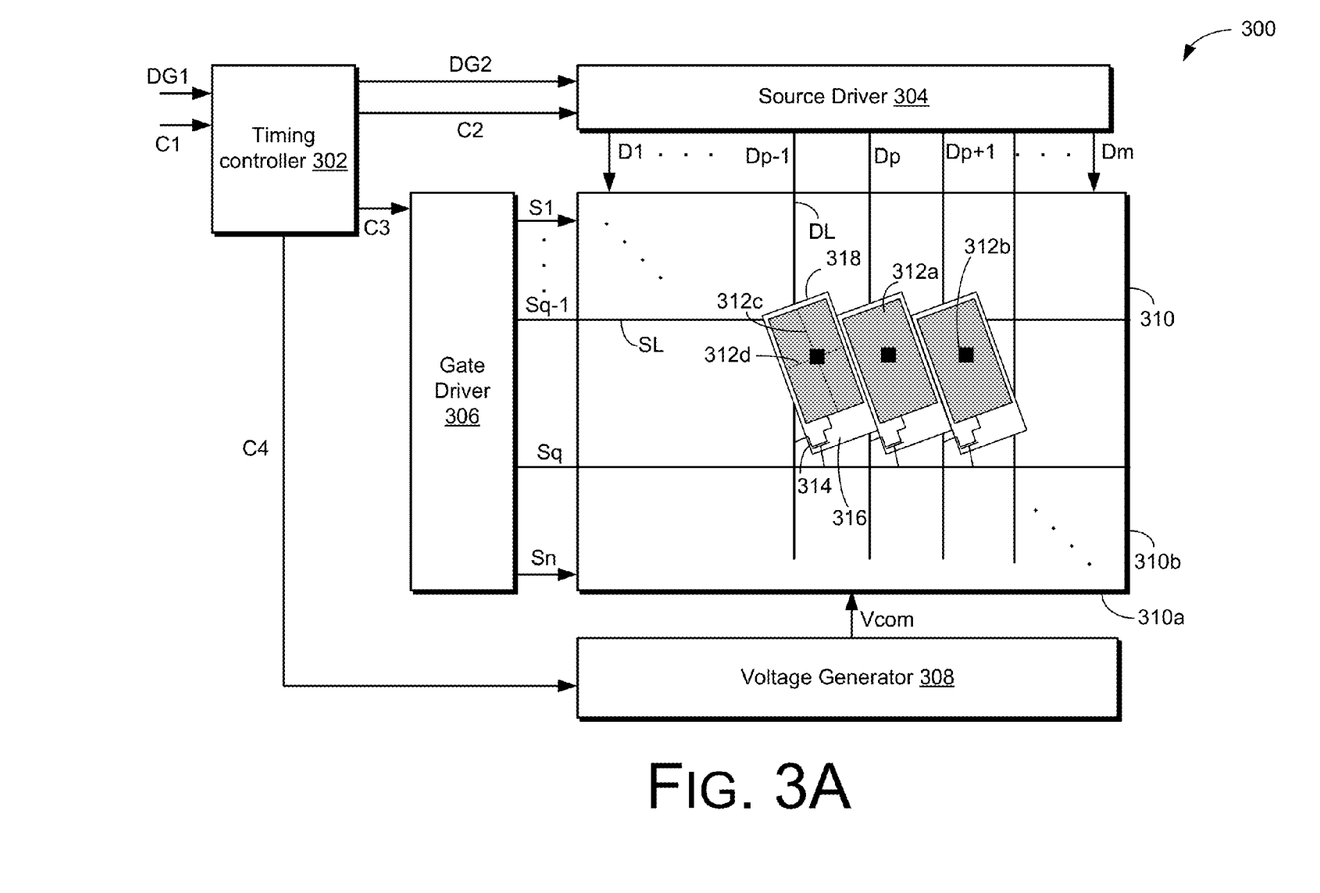
FIG. 3A is a schematic view of an example of an electrowetting display device that includes an arrangement of sub-pixels at least similar to the arrangement of sub-pixels of FIG. 2, according to various embodiments.

Referring to FIG. 3A, an example of an electrowetting display device 300 is schematically illustrated that includes a timing controller 302, a source driver (data driver) 304, a gate driver (scan driver) 306, a voltage generator 308, and an electrowetting display panel 310. The electrowetting display panel 310 is driven by the timing controller 302, the source driver 304, the gate driver 306, and the voltage generator 308.

As an example of general operation of the electrowetting display device 300, responsive to a first data signal DG1 and a first control signal C1 from an external source, e.g., a graphic controller (not illustrated), the timing controller 302 applies a second data signal DG2 and a second control signal C2 to the source driver 304; a third control signal C3 to the gate driver 306; and a fourth control signal C4 to the voltage generator 308.

The source driver 304 converts the second data signal DG2 to voltages, i.e., data signals, and applies the data signals D1, . . . , Dp−1, Dp, Dp+1, . . . , Dm to the electrowetting display panel 310. The gate driver 306 sequentially applies scan signals S1, . . . , Sq−1, Sq, . . . , Sn to the electrowetting display panel 310 in response to the third control signal C3.

The voltage generator 308 applies a common voltage Vcom to the electrowetting display panel 310 in response to the fourth control signal C4. Although not illustrated in FIG. 3A, the voltage generator 308 generates various voltages required by the timing controller 302, the source driver 304, and the gate driver 306.

The electrowetting display panel 310 includes m data lines D, i.e., source lines, to transmit the data voltages and n gate lines S, i.e., scan lines, to transmit a gate-on signal.

Pixel regions 312a are positioned adjacent to crossing points of the data lines D and the gate lines S crossing the data lines D and thus are arranged in a grid of rows and columns. The pixel regions 312a generally correspond to the sub-pixels 202 illustrated in FIGS. 2A and 2B and are therefore arranged at an angle with respect to borders 310a, 310b of the electrowetting display panel 310. The pixel regions 312a are arranged diagonally, for example, at a 45-degree angle, with respect to the horizontal border 310a and the vertical border 310b of the electrowetting display panel 310. The pixel regions 312a include centers of luminance 312b.

As previously noted, the sub-pixels 202 of FIG. 2, and thus, the pixel regions 312a, have a substantially rectangular shape. Due to the 45-degree angle orientation of the pixel regions 312a, a major axis 312c of each pixel region 312a is at a 45-degree angle with respect to border 310a, while a minor axis 312d of each pixel region 312a is at a 45-degree angle with respect to border 310b. Depending upon the configuration of the electrowetting display device 300, each pixel region 312a can represent a pixel as opposed to a sub-pixel.

Each pixel region 312a is made up of a hydrophobic surface that includes a thin film transistor 314 and a pixel electrode 316 under the hydrophobic surface. Each pixel region 312a may also include a storage capacitor (not illustrated) under the hydrophobic surface. A pixel wall 318 defines the pixel region 312. Generally, the pixel wall 318 is actually a plurality of intersecting pixel walls (either separate or continuous) that define a grid of pixel regions 312a.

Each thin film transistor 314 is coupled to a corresponding data line D and a corresponding gate line S. In an embodiment, each pixel region 312a is arranged and oriented such that the pixel region's corresponding center of luminance 312b is located over the intersection of the pixel region's corresponding data line D and corresponding gate line S. Thus, in such an embodiment, the pixel region's corresponding thin film transistor 314 is located under the pixel region's corresponding center of luminance 312b.

Figure 3B:
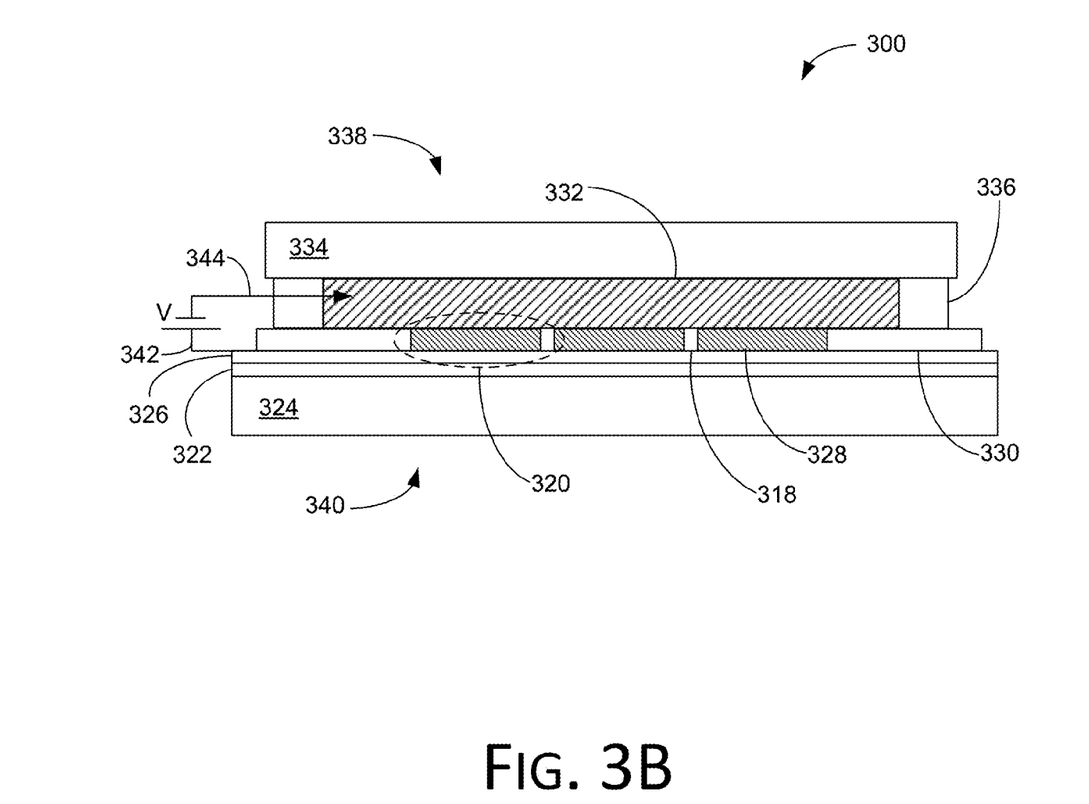
FIG. 3B is a cross-section of a portion of the electrowetting display device of FIG. 3A, according to some embodiments.

FIG. 3B is a cross-section of a portion of the electrowetting display device 300 illustrating several electrowetting elements 320 that generally correspond to pixel regions 312, according to some embodiments. An electrode layer 322 that includes the pixel electrodes 316 (not illustrated in FIG. 3B) is formed on a bottom substrate or support plate 324. Generally, the electrode layer 322 comprises indium tin oxide (ITO). In some implementations, a dielectric barrier layer (not illustrated) may at least partially separate the electrode layer 322 from a hydrophobic layer 326 also formed on the bottom substrate 324 over the electrode layer 322. In some implementations, the hydrophobic layer 326 can comprise a fluoropolymer, such as, for example, AF1600, produced by DuPont, based in Wilmington, Del. The pixel walls 318 form a patterned electrowetting element grid on the hydrophobic layer 326, as can be seen in FIG. 3A. The pixel walls 318 may comprise a photoresist material, such as, for example, epoxy-based negative photoresist SU-8. The patterned electrowetting element grid comprises rows and columns that form an electrowetting element array (e.g., electrowetting display panel 310) of field electrowetting elements and border electrowetting elements. For example, an electrowetting element can have a width and length in a range of about 50 to 500 microns. A first fluid 328, which can have a thickness in a range of about 1 to 10 microns, for example, overlies the hydrophobic layer 326. The first fluid 328 is generally an electrowetting oil and is partitioned by the pixel walls 318 of the patterned electrowetting element grid. An outer rim 330 can comprise the same material as the pixel walls 318. A second fluid 332, such as a fluid that includes an electrolyte and thus is an electroconductive or polar liquid, overlies the electrowetting oil 328 and the pixel walls 318 of the patterned electrowetting element grid.

A top substrate or support plate 334 covers the second fluid 332 and an adhesive/sealing material 336 retains the second fluid 332 over the electrowetting element array. The adhesive/sealing material 336 generally comprises ultraviolet (UV) curable epoxy glue, although other types of adhesive/sealing material are acceptable. The bottom substrate 324 and the top substrate 334 may be separate parts of individual electrowetting elements or the bottom substrate 324 and the top substrate 334 may be shared by a plurality of electrowetting elements. The bottom substrate 324 and the top substrate 334 may be made of glass or polymer and may be rigid or flexible, for example.

A voltage V applied across the second fluid 332 and the dielectric barrier layer stack (e.g., the hydrophobic layer 326) of individual electrowetting elements can control transmittance or reflectance of the individual electrowetting elements 320.

The electrowetting display device 300 has a viewing side 338 on which an image for display formed by the electrowetting display device 300 can be viewed, and a rear side 340. The top substrate 334 faces viewing side 338 and the bottom substrate 324 faces the rear side 340. The top substrate 334 is coupled to the bottom substrate 324 with the adhesive/sealing material 336. In an alternative embodiment, the electrowetting display device 300 may be viewed from the rear side 340. The electrowetting display device 300 may be a reflective, transmissive or transreflective type. The electrowetting display device 300 may be a segmented display type in which the image is built up of segments. The segments can be switched simultaneously or separately. Each segment includes one electrowetting element 320 or a number of electrowetting elements 320 that may be neighboring or distant from one another. The electrowetting elements 320 included in one segment are switched simultaneously, for example. The electrowetting display device 300 may also be an active matrix driven display type or a passive matrix driven display, just to name a few examples.

The second fluid 332 is immiscible with the first fluid 328. Generally, immiscible refers to the inability of the second fluid 332 to mix or blend with the first fluid 328. The second fluid 332 generally includes an electrolyte and is electrically conductive or polar. The second fluid 332 may be water or a salt solution such as a solution of potassium chloride in a mixture of water and ethyl alcohol, for example. The second fluid may comprise at least one component selected from the group consisting of: ethylene glycol; diethyleneglycol; polyethylene glycol; propylene glycol; dioxalane; glyoxal; citric acid; oxalic acid; oxamic acid; and formic acid; and includes a second component which is different from the first component and is selected from the group consisting of: erythritol; ethylene glycol; ethylene carbonate; propylene carbonate; glycerol; and butanetriol.

The second fluid 332 is preferably transparent, but may be colored, white, absorbing or reflecting. The first fluid 328, generally referred to as electrowetting oil, is electrically non-conductive and may for instance be an alkane like hexadecane or (silicone) oil. The hydrophobic layer 326 is arranged on the bottom substrate 324 to create an electrowetting surface area. The hydrophobic character causes the first fluid 328 to adhere preferentially to the bottom substrate 324 since the first fluid 328 has a higher wettability with respect to the surface of the hydrophobic layer 326 than it has with respect to the second fluid 332. Wettability relates to the relative affinity of a fluid for the surface of a solid. Wettability increases with increasing affinity, and it can be measured by the contact angle formed between the fluid and the solid and measured internal to the fluid of interest. For example, such a contact angle can increase from relative non-wettability of more than 90° to complete wettability at 0°, in which case the fluid tends to form a film on the surface of the solid.

The electrode layer 322 is separated from the first fluid 328 and the second fluid 332 by an insulator, which may be the hydrophobic layer 326. The electrode layer 322 (and thereby the electrodes 316) is supplied with voltage signals V by a first signal line 342. A second signal line 344 is electrically connected to a top electrode (not illustrated) that is in contact with the conductive second fluid 332. This top electrode may be common to more than one electrowetting element 320 since the electrowetting elements 320 are generally fluidly interconnected by and share the second fluid 332 uninterrupted by the pixel walls 318. The electrowetting elements 320 are controlled by the voltage V applied between the first and second signal lines 342 and 344.

The first fluid 328 absorbs at least a part of the optical spectrum. The first fluid 328 may be transmissive for a part of the optical spectrum, forming a color filter. For this purpose, the first fluid 328 may be colored by addition of pigment particles or dye, for example. Alternatively, the first fluid 328 may be black (e.g., absorbing substantially all parts of the optical spectrum) or reflecting. The hydrophobic layer 326 may be transparent or reflective. A reflective layer may reflect the entire visible spectrum, making the layer appear white, or part of it, making it have a color.

When the voltage V applied between the signal lines 342 and 344 is set at a non-zero active signal level, the electrowetting element 320 will enter into an active state. Electrostatic forces will move the second fluid 332 toward the electrode layer 322, thereby repelling the first fluid 328 from the area of the hydrophobic layer 326 to the pixel walls 318 surrounding the area of the hydrophobic layer 326, to a droplet-like shape. This action uncovers the first fluid 328 from the surface of the hydrophobic layer 326 of the electrowetting element 320. When the voltage across the electrowetting element 320 is returned to an inactive signal level of zero volts or a value near to zero volts, the electrowetting element 320 will return to an inactive state, where the first fluid 328 flows back to cover the hydrophobic layer 326. In this way, the first fluid 328 forms an electrically controllable optical switch in each electrowetting element 320.

Generally, the thin film transistor 314 includes a gate electrode that is electrically connected to a corresponding scan line of the scan lines S, a source electrode that is electrically connected to a corresponding data line (e.g., first signal line 342 of FIG. 3B) of the data lines D, and a drain electrode that is electrically connected to the pixel electrode 316. Thus, the pixel regions 312a are operated, i.e. driving of the electrowetting display device 300, based upon the scan lines S and the data lines D of FIG. 3A.

While embodiments of the present disclosure have been described primarily with respect to electrowetting displays, other types of displays can benefit from the present disclosure. For example, LCDs, electrophoretic displays, cholesteric LCDs, organic light emitting diode (OLED) displays, plasma panels, field emission displays, electrofluidic pixel displays, photonic ink displays, and other display technologies can benefit from the present disclosure and thus, the present disclosure is not limited to electrowetting displays.

Figure 4:
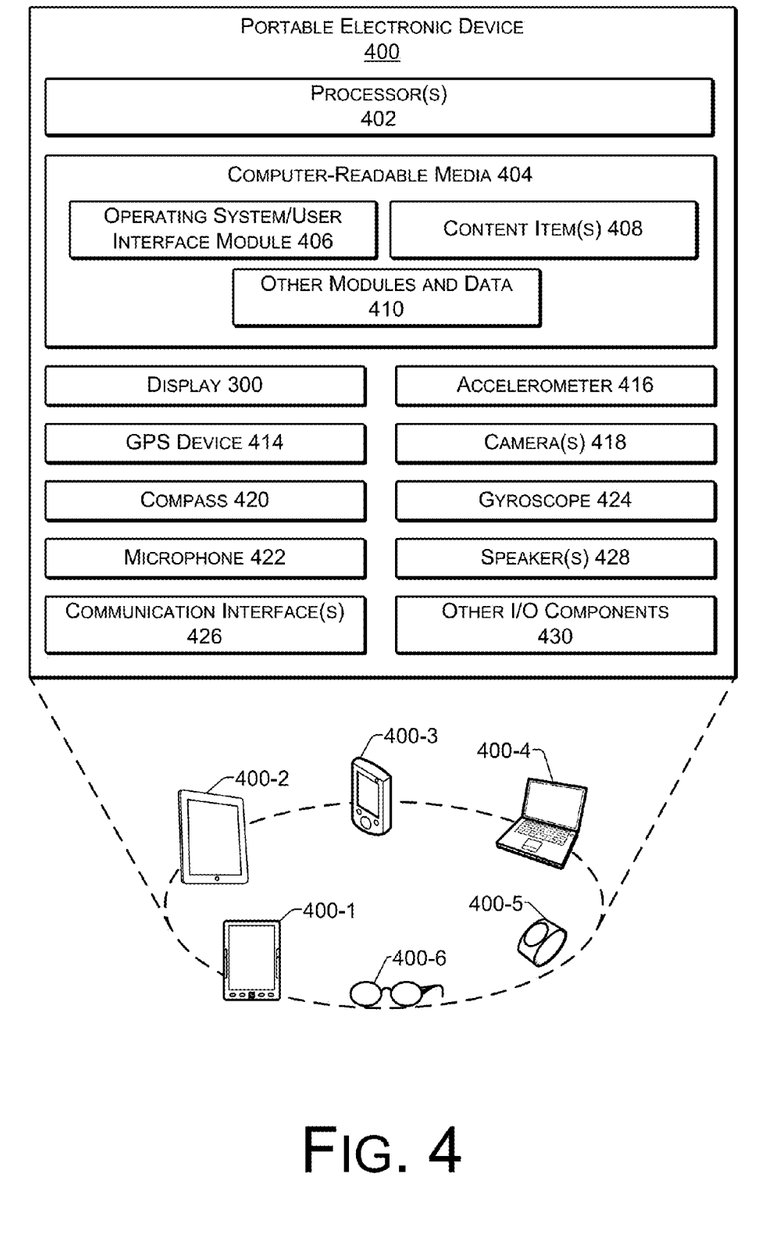
FIG. 4 illustrates select components of an example image display apparatus that may include an electrowetting display device according to various embodiments described herein.

FIG. 4 illustrates select example components of an example image display apparatus 400 that may be used with the electrowetting display device 300 according to some implementations. Other types of displays may also be used with the example image display apparatus 400. Such types of displays include, but are not limited to, LCDs, cholesteric displays, electrophoretic displays, electrofluidic pixel displays, photonic ink displays, and the like.

The image display apparatus 400 may be implemented as any of a number of different types of electronic devices. Some examples of the image display apparatus 400 may include digital media devices and eBook readers 400-1; tablet computing devices 400-2; smart phones, mobile devices and portable gaming systems 400-3; laptop and netbook computing devices 400-4; wearable computing devices 400-5; augmented reality devices, helmets, goggles or glasses 400-6; and any other device capable of connecting with the electrowetting display device 100 and including a processor and memory for controlling the display according to the techniques described herein.

In a very basic configuration, the image display apparatus 400 includes, or accesses, components such as at least one control logic circuit, central processing unit, or processor 402, and one or more computer-readable media 404. Each processor 402 may itself comprise one or more processors or processing cores. For example, the processor 402 can be implemented as one or more microprocessors, microcomputers, microcontrollers, digital signal processors, central processing units, state machines, logic circuitries, and/or any devices that manipulate signals based on operational instructions. In some cases, the processor 402 may be one or more hardware processors and/or logic circuits of any suitable type specifically programmed or configured to execute the algorithms and processes described herein. The processor 402 can be configured to fetch and execute computer-readable instructions stored in the computer-readable media 404 or other computer-readable media. The processor 402 can perform one or more of the functions attributed to the timing controller 302, the data driver 304, and/or the scan driver 306 of the electrowetting display device 300. The processor 402 can also perform one or more functions attributed to a graphic controller (not illustrated) for the electrowetting display device.

Depending on the configuration of the image display apparatus 400, the computer-readable media 404 may be an example of tangible non-transitory computer storage media and may include volatile and nonvolatile memory and/or removable and non-removable media implemented in any type of technology for storage of information such as computer-readable instructions, data structures, program modules or other data. The computer-readable media 404 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the image display apparatus 400 may access external storage, such as RAID storage systems, storage arrays, network attached storage, storage area networks, cloud storage, or any other medium that can be used to store information and that can be accessed by the processor 402 directly or through another computing device or network. Accordingly, the computer-readable media 404 may be computer storage media able to store instructions, modules or components that may be executed by the processor 402.

The computer-readable media 404 may be used to store and maintain any number of functional components that are executable by the processor 402. In some implementations, these functional components comprise instructions or programs that are executable by the processor 402 and that, when executed, implement operational logic for performing the actions attributed above to the image display apparatus 400. Functional components of the image display apparatus 400 stored in the computer-readable media 404 may include the operating system and user interface module 406 for controlling and managing various functions of the image display apparatus 400, and for generating one or more user interfaces on the electrowetting display device 300 of the image display apparatus 400.

In addition, the computer-readable media 404 may also store data, data structures and the like, that are used by the functional components. For example, data stored by the computer-readable media 404 may include user information and, optionally, one or more content items 408. Depending on the type of the image display apparatus 400, the computer-readable media 404 may also optionally include other functional components and data, such as other modules and data 410, which may include programs, drivers and so forth, and the data used by the functional components. Further, the image display apparatus 400 may include many other logical, programmatic and physical components, of which those described are merely examples that are related to the discussion herein. Further, while the figures illustrate the functional components and data of the image display apparatus 400 as being present on the image display apparatus 400 and executed by the processor 402 on the image display apparatus 400, it is to be appreciated that these components and/or data may be distributed across different computing devices and locations in any manner.

FIG. 4 further illustrates examples of other components that may be included in the image display apparatus 400. Such examples include various types of sensors, which may include a GPS device 412, an accelerometer 414, one or more cameras 416, a compass 418, a gyroscope 420, a microphone 422, and so forth.

The image display apparatus 400 may further include one or more communication interfaces 424, which may support both wired and wireless connection to various networks, such as cellular networks, radio, Wi-Fi networks, close-range wireless connections, near-field connections, infrared signals, local area networks, wide area networks, the Internet, and so forth. The communication interfaces 424 may further allow a user to access storage on or through another device, such as a remote computing device, a network attached storage device, cloud storage, or the like.

The image display apparatus 400 may further be equipped with one or more speakers 426 and various other input/output (I/O) components 428. Such I/O components 428 may include a touchscreen and various user controls (e.g., buttons, a joystick, a keyboard, a keypad, etc.), a haptic or tactile output device, connection ports, physical condition sensors, and so forth. For example, the operating system 406 of the image display apparatus 400 may include suitable drivers configured to accept input from a keypad, keyboard, or other user controls and devices included as the I/O components 428. Additionally, the image display apparatus 400 may include various other components that are not illustrated, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. An electrowetting display device comprising a plurality of sub-pixels, wherein each sub-pixel has a substantially rectangular shape defined by a major axis and a minor axis, wherein the major axis is longer than the minor axis, and wherein each sub-pixel comprises:
    a hydrophobic surface;
    an electrowetting oil on the hydrophobic surface and a fluid that includes an electrolyte on the electrowetting oil;
    a pixel electrode under the hydrophobic surface; and
    a thin film transistor coupled to the pixel electrode and a voltage source, wherein each sub-pixel is operated by applying a voltage via the thin film transistor and the voltage source to the hydrophobic surface via the pixel electrode in conjunction with a common electrode such that the voltage causes the hydrophobic surface to become more hydrophilic allowing the fluid that includes the electrolyte to move onto the hydrophobic surface to substantially displace a portion of the electrowetting oil on the hydrophobic surface, and
    wherein the plurality of sub-pixels are arranged in a slanted relationship such that the major axis of each sub-pixel is at a 45 degree angle with respect to a horizontal border of the electrowetting display device and a vertical border of the electrowetting display device and the minor axis is at a 45 degree angle with respect to the horizontal border of the electrowetting display device and the vertical border of the electrowetting display device such that a first distance between (i) a center of luminance within a first sub-pixel and (ii) a center of luminance within an adjacent second sub-pixel along a horizontal axis is substantially equal to a second distance between (iii) the center of luminance within the first sub-pixel and (iv) a center of luminance within an adjacent third sub-pixel along a vertical axis.

2. The electrowetting display device of claim 1, wherein the electrowetting display device is a red, green, blue and white (RGBW) display device and each sub-pixel represents one of a red sub-pixel, a green sub-pixel, a blue sub-pixel and a white sub-pixel.

3. The electrowetting display device of claim 1, wherein each sub-pixel includes a center of luminance.

4. An electrowetting display device comprising a plurality of sub-pixels, wherein each sub-pixel includes a center of luminance and comprises:
    a substrate;
    an electrode layer on the substrate;
    a hydrophobic layer on the electrode layer;
    a first fluid disposed on the hydrophobic layer; and
    a second fluid disposed on the first fluid, the second fluid being immiscible with the first fluid,
    wherein each sub-pixel of the plurality of sub-pixels is arranged at an angled relationship with respect to a horizontal border of the electrowetting display device and a vertical border of the electrowetting display device.

5. The electrowetting display device of claim 4, wherein two or more sub-pixels represent a pixel of the electrowetting display device.

6. The electrowetting display device of claim 4, wherein each sub-pixel of the plurality of sub-pixels is arranged at an angled relationship of 45 degrees with respect to the horizontal border of the electrowetting display device and the vertical border of the electrowetting display device such that (i) a center of luminance within a first sub-pixel is spaced from a center of luminance within an adjacent second sub-pixel along a horizontal axis at approximately 81 microns and (ii) the center of luminance within the first sub-pixel is spaced from a center of luminance within an adjacent third sub-pixel along a vertical axis at approximately 81 microns.

7. The electrowetting display device of claim 4, wherein the electrowetting display device is a red, green, blue and white (RGBW) display device and each sub-pixel represents one of a red sub-pixel, a green sub-pixel, a blue sub-pixel and a white sub-pixel.

8. The electrowetting display device of claim 7, wherein the plurality of sub-pixels are arranged in an order of a red sub-pixel adjacent to a green sub-pixel adjacent to a blue sub-pixel adjacent to a white sub-pixel.

9. The electrowetting display device of claim 4, wherein the electrowetting display device is a red, green and blue (RGB) display device and each sub-pixel represents one of a red sub-pixel, a green sub-pixel and a blue sub-pixel.

10. An electronic device comprising an electrowetting display device comprising a plurality of sub-pixels, wherein each sub-pixel includes a center of luminance and comprises:
    a substrate;
    an electrode layer on the substrate;
    a hydrophobic layer on the electrode layer;
    a first fluid disposed on the hydrophobic layer; and
    a second fluid disposed on the first fluid, the second fluid being immiscible with the first fluid,
    wherein each sub-pixel of the plurality of sub-pixels is arranged in an angled relationship with respect to a horizontal border of the electrowetting display device and a vertical border of the electrowetting display device.

11. The electronic device of claim 10, wherein two or more sub-pixels represent a pixel of the electrowetting display device.

12. The electronic device of claim 10, wherein each sub-pixel of the plurality of sub-pixels is arranged at an angled relationship of 45 degrees with respect to the horizontal border of the electrowetting display device and the vertical border of the electrowetting display device such that (i) a center of luminance within a first sub-pixel is spaced from a center of luminance within an adjacent second sub-pixel along a horizontal axis at approximately 81 microns and (ii) the center of luminance within the first sub-pixel is spaced from a center of luminance within an adjacent third sub-pixel along a vertical axis at approximately 81 microns.

13. The electronic device of claim 10, wherein the electrowetting display device is a red, green, blue and white (RGBW) display device and each sub-pixel represents one of a red sub-pixel, a green sub-pixel, a blue sub-pixel and a white sub-pixel.

14. The electronic device of claim 13, wherein the plurality of sub-pixels are arranged in an order of a red sub-pixel adjacent to a green sub-pixel adjacent to a blue sub-pixel adjacent to a white sub-pixel.

15. The electronic device of claim 10, wherein the electronic device comprises one of a digital media device, an eBook reader, a tablet computing device, a smart phone, a mobile device, a portable gaming system, a laptop computing device, a netbook computing device, a wearable computing device, or an augmented reality device.

16. The electronic device of claim 10, wherein the electrowetting display device is a red, green and blue (RGB) display device and each sub-pixel represents one of a red sub-pixel, a green sub-pixel and a blue sub-pixel.

17. A display comprising:
a plurality of sub-pixels, wherein each sub-pixel comprises a center of luminance,
wherein the plurality of sub-pixels are arranged in a slanted relationship such that each sub-pixel is at a 45 degree angle with respect to a horizontal border of the display and a vertical border of the display such that a first distance between (i) a center of luminance within a first sub-pixel and (ii) a center of luminance within an adjacent second sub-pixel along a horizontal axis is substantially equal to a second distance between (iii) the center of luminance within the first sub-pixel and (iv) a center of luminance within an adjacent third sub-pixel along a vertical axis.

18. The display of claim 17, wherein two or more sub-pixels represent a pixel of the display.

19. The display of claim 17, wherein the first distance and the second distance are each approximately 81 microns.

20. The display of claim 17, wherein the display is a red, green, blue and white (RGBW) display and each sub-pixel represents one of a red sub-pixel, a green sub-pixel, a blue sub-pixel and a white sub-pixel.

* * * * *